J. FLAMMANG.
PROCESS OF MANUFACTURING PISTON RINGS.
APPLICATION FILED NOV. 5, 1915.
1,212,337.                                      Patented Jan. 16, 1917.
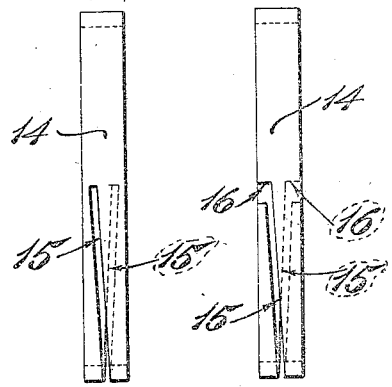
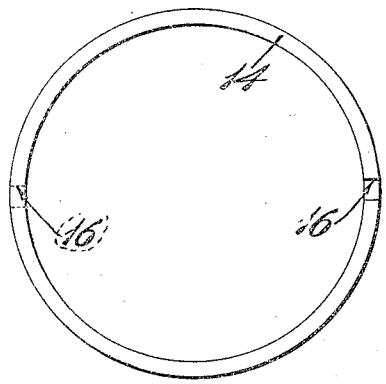
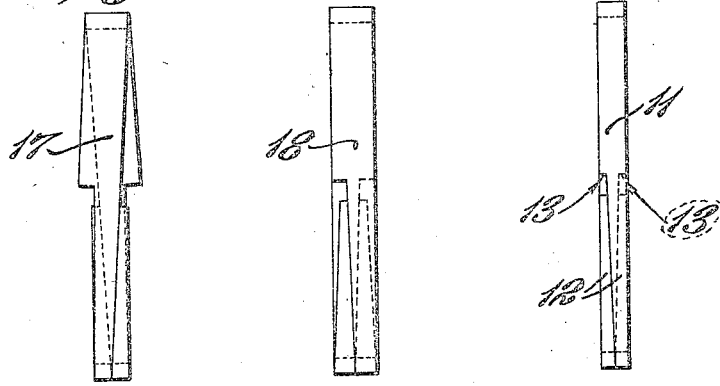
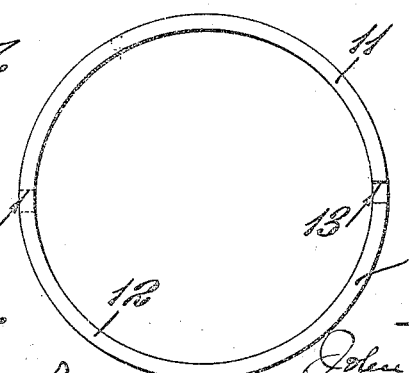

UNITED STATES PATENT OFFICE.

JOHN FLAMMANG, OF ST. LOUIS, MISSOURI, ASSIGNOR TO INLAND MACHINE WORKS, OF ST. LOUIS, MISSOURI, A CORPORATION OF MISSOURI.

PROCESS OF MANUFACTURING PISTON-RINGS.

1,212,337.     Specification of Letters Patent.     Patented Jan. 16, 1917.

Application filed November 5, 1915. Serial No. 59,769.

*To all whom it may concern:*

Be it known that I, JOHN FLAMMANG, a citizen of the United States, and a resident of the city of St. Louis and State of Missouri, have invented a new and useful Improvement in Processes of Manufacturing Piston-Rings, of which the following is a specification.

This invention relates to flexible metallic rings for packing the pistons of reciprocating engines, and it consists in the process of manufacture hereinafter described.

The details of the invention appear from the following description of the piston ring shown in the accompanying drawings, and the process of making the same.

In the drawings, in which like characters designate the same parts in the several views, Figure 1 is a side view of a partly formed piston ring, showing its form after the first cutting operation; Fig. 2 is a view similar to Fig. 1 of the same after the second cutting operation; Fig. 3 is a face view of the partly finished ring shown in Fig. 2; Fig. 4 is a side view of the same showing it after being inverted or reversed with respect to the relative position of the overlapping tapered ends; Fig. 5 is a side view of the same after reinversion; Fig. 6 is a side view of the same after the faces of the ring have been finished; and Fig. 7 is a face view of the finished ring.

The finished piston ring, shown in Figs. 6 and 7, consists of a circularly formed strip of cast iron or steel 11 having its ends notched and tapered off, the tapered portions 12 being lapped for about one-half of the circumference of the ring, and each terminating a short distance from the notch 13 in the other end of the strip. The length of the tapered portions 12 and relative location of the notches 13 with respect thereto is such that when the ring is compressed into a cylinder of the size for which it is intended, each extremity of the ring will almost touch the transverse wall of the notch, leaving but a very narrow space between the two. Hence, any gas which may find its way between the end of the ring and the notch into the groove in the piston will have to travel one-half way around the groove to the opposite end of the ring and between the end of the ring and the opposite notch before it can escape from the cylinder. The lapped ends of the ring are in close contact throughout, and are maintained in this position by the resiliency of the metal, which is so disposed that it tends to spring them together.

The process of constructing the piston ring, as shown in the drawings, consists in cutting a spiral slot 15 in a suitable metal hoop or ring 14 from a point near one edge of the ring to a diametrically opposite point near the opposite edge thereof. This spiral may consist of any uneven number of half convolutions. The next operation is to cut notches 16 through the edges of the ring opposite the ends of the spiral slot to form a ziz-zag cut extending from one flat side or face of the ring to the other. The solid ring 14 is thus split into a ring shaped strip of metal having overlapping tapered ends which are spaced apart the width of the slot 15.

The next operation is inverting the split ring 14, that is, reversing the relative positions of the ends by passing one by the other, as shown in Fig. 4. In case the spiral has more than one convolution, it may be inverted by passing each convolution progressively from one end through or over the remaining convolutions and continuing the operation until all of the convolutions have been passed through or over the undisturbed portion of the coil. This operation changes the coil from a right hand spiral to a left hand spiral, or vice versa; and changes the coil as a whole from an open spiral to a closed spiral in which the individual convolutions are held by spring tension against separating from those adjacent thereto. The force tending to hold the convolutions in contact depends upon the elasticity of the material, the diameter of the coil, and the width of the space between the open coils as originally made. The inverted ring 17 thus produced is heated or hammered until the disturbance of its molecular structure, due to the distortion of its shape from its original form, is entirely corrected by the rearrangement of the molecules in equilibrium and in conformity with the new shape. Heating to a dull red heat and cooling slowly is sufficient for this purpose. Reinversion of the ring 17 to position its ends on the same relative sides or faces as originally, produces strains in the metal which cause the ends of the ring to bear snugly against its sides, forming a tight joint from end to end of the overlapping portions. The closed ring 18 thereby produced needs only to be faced off on its end faces and ground on its periphery to give it the form of the finished piston ring 11. The facing off and grinding may be done in the usual way, the ring being held in a fixture so that its diameter is approximately that of the cylinder for which it is intended.

The order of the initial cutting operations is not important, nor is that of the final finishing operations. It is evident that changes in the form and proportions of the device may be made to suit different conditions. The invention is not restricted to the precise form and proportions of the ring shown, nor to the above described process of manufacture, except as expressly set forth in the claims.

I claim the following as my invention:

1. The process of forming a piston ring having overlapping end portions which comprises splitting a solid ring in a long zigzag cut extending circumferentially, inverting the split ring thereby formed, treating the inverted ring to remove molecular strains, and reversing the inverted ring.

2. The process of forming a piston ring having overlapping tapered ends which comprises splitting a solid ring in a long diagonal line, inverting the split ring thereby formed, treating the inverted ring to remove molecular strains, and reversing the inverted ring.

3. The process of forming a piston ring having overlapping spiral portions with tapered ends which comprises cutting a long spiral slot in the periphery of a solid ring, the ends of said slot terminating near the opposite sides of said ring, cutting notches in the opposite sides of said ring to intersect the ends of said slot, inverting the split ring thereby formed, treating the inverted ring to remove molecular strains, and reversing the inverted ring.

4. The process of forming a spiral piston ring which comprises forming a cylindrical helix, treating it to remove molecular strains and inverting it into a closed coil helix having its contacting edges under tension to force them together sidewise.

5. The process of forming a spiral piston ring which comprises forming an open coil cylindrical helix and inverting it into a closed coil helix, treating the inverted ring to remove molecular strains, and reversing the inverted ring.

6. The process of forming a split piston ring which comprises cutting a spiral slot in an annular blank, severing the wall of the blank opposite each end of the slot, inverting the open coil helix thus formed, heating the inverted helix to a dull red and cooling slowly, and reinverting the helix.

7. The process of forming a one-piece piston ring which comprises splitting an annular blank lengthwise between its side faces around about one-half of its circumference, severing the edges of the blank on opposite sides, one at each end of the split portion, treating the blank to bring the lapping ends snugly together sidewise throughout their length, and finishing the side faces of the blank to make them parallel.

8. The process of forming a one-piece piston ring which comprises splitting an annular blank lengthwise between its side faces around about one-half of its circumference, cutting wide gaps through each of the edges of the blank on opposite sides, one at each end of the split portion, treating the blank to bring the lapping ends snugly together sidewise throughout their length, compressing the blank to close said gaps and finishing the outer circumference of the blank to cylindrical form, and finishing the side faces of the blank to make them parallel.

Signed at St. Louis, Missouri, this second day of November, 1915.

JOHN FLAMMANG.